2,739,950
SYNTHETIC SPONGES AND FORMATION THEREOF

Alex A. Nelson, Royal Oak, Mich.

No Drawing. Application January 12, 1951, Serial No. 205,837

8 Claims. (Cl. 260—2.5)

This invention relates to soft sponges and spongy compositions, and to their preparation, from synthetic resins. Particularly, this invention utilizes synthetic resins of thermoplastic nature, especially the resins known broadly as vinyl resins.

Sponges of synthetic resin have long been proposed, even porous products of vinyl resins, but such products have lacked success. This is evidenced by the considerable number of suggestions recorded and by an extensive history of efforts to manufacture soft spongy compositions of resin. The products have lacked the soft feel and texture of desirable sponge or have lacked the firmness and resilience also desired. Since some synthetic resins of themselves are hard at ordinary temperatures, incorporation of plasticizer in forming sponge has been suggested frequently. But proper amounts of plasticizer have been difficult to incorporate in such ways as to maintain suitable qualities in the resin over the extensive temperature ranges that have usually been involved in manufacture or in use of sponge. Too much plasticizer or too little has been the frequent complaint and has resulted in complicated plans for incorporating the plasticizer. Such problems have grown with efforts to heat a mass of resin to some temperature suitable for setting bubbles or cellular spaces within the mass of resin. The nature of thermoplastic synthetic resin has complicated the problems, for the resin melts or fuses or even changes its molecular condition on heating. Consequently, both the physical and the chemical qualities of thermoplastic synthetic resin have hindered attainment of suitable soft spongy texture in such resin.

In vinyl resins, retention and orientation of characteristic molecular groups affect the surface forces involved in a soft but resilient sponge. Many of the difficulties are really at what may be termed the molecular level. Where heat and where distortion of the basic vinyl molecular pattern are involved, as they often are, production of suitable synthetic plastic sponge becomes difficult. Often the difficulties are complicated by the presence of plasticizers and fillers. Thus, for example, tensile strength and odor of plastic sponge are but resultant manifestations of molecular stresses within the plastic.

With vinyl resins, according to this invention, a theoretical problem involved in spongy structure is to maintain appropriate linear alignments and angular relationships of significant molecular groups. Intermediate mesomorphic conditions may be involved. Long, accordion-like chains of offset vinyl groups, with appropriate cross-linkages, modified by presence of plasticizers, evidently determine the molecular tensions and surface forces that give the product of this invention a soft spongy feel combined with adequate elasticity to resume a given position after deformation. But this invention in no way depends on theoretical concepts. Practical problems are to manipulate vinyl resin without plasticizers or with plasticizers as the case may be so as to obtain a strong but soft, unitary, expanded, cellular, spongy wall. Further problems are to obtain vinyl sponge having marked elasticity, resilience and pliability, tensile strength or resistance to stretching and tearing, long life and maintenance of characteristic soft sponginess. Other problems are to produce vinyl sponge molded products, to control the sponge characteristics, and to simplify techniques of sponge production.

In this description of the invention and in the claims the term vinyl is used broadly according to current practice well-understood by those skilled in the art. This term comprehends esters of various polyvinyl polymers of monobasic and dibasic acids, such as formate, acetate, propionate, butyrate or fumarate, maleate and the like. These typify organic esters, but this invention includes esters with inorganic acids also well known, as for example, polyvinyl chloride, bromide or fluoride. Similarly, this invention includes treatment of the copolymers, of which vinyl resin, copolymer of vinyl chloride and vinyl acetate is illustrative but not limiting, as well as treatment of the polyvinylidene esters and of polyvinyl ethers. For further illustration, reference frequently will be made to vinyl chloride, but those skilled in the art will not regard this as limiting and will now recognize that the other resins particularly thermoplastic resins, similarly are to be utilized by this invention. Such resins of themselves are widely known, as well as their plasticization.

Heretofore in the art, efforts to produce acceptable synthetic resin sponge have sought to build a foam by incorporating gases in the resin. Some proposals are to apply an atmosphere of gas under pressure to a body of resin and subsequently to release the pressure, with the purpose of expanding the gas. Others suggest mixing in the resin some acid and a chemical to react with the acid for release of gas in the resin, but this yields unwanted hardening or polymerizing effects that acidic substances often exert on resins. Other suggestions are to embody in the resin various organic compounds that may be decomposed to gaseous condition. All of these have been objectionable, aside from definitely deleterious effects, in their lack of control. In part, the lack of control relates to quantity of gas released or to rate of release of gas, and so to lack of control of the product. Worse, however, is the lack of control of temperature, where practice of these prior suggestions involves heating the mass of resin to some elevated temperature; for at such temperatures the resin either is too soft to retain suitable wall structure or is too hard to form extensive gas cells. The presence of plasticizers has aggravated various faults of the prior art. Usually the resinous foams produced have been too dense or too hard for sponge uses or else too weak.

This invention purposes to make full use of existing vinyl resins and plasticizers therefor, but to introduce and to control such factors as will favor commercially acceptable and dependable processes, controllable and effective to obtain soft vinyl sponge, and to form various articles of soft, but elastic and strong, vinyl sponge. The techniques of setting and molding such resins, as well as the uses of plasticizers, are taken to be well-known of themselves to those skilled in the art.

Various benefits of this invention are obtained by generating gas within a body of vinyl resin by self-propagating, exothermic chemical reactions while the resin is curing. Preferably these desired reactions are highly temperature-responsive in the sense of being initiated and also controlled through temperature conditions within the resin. Certain advantages further are gained by thus generating gas under non-acidic conditions, whether alkaline or neutral conditions. In forming desirable sponge of vinyl polymers or co-polymers, it is preferred to conduct these gas-generating reactions in the presence of hydroxyl compounds, especially in the presence of caustic soda, or of substances that yield similar reagent. Suitable reagents with alkali metal hydroxide, carbonate or equivalent are metals that react therewith; aluminum is one that is particularly suitable. Nevertheless other metals that react with oxide or hydroxide may be used; such for example as magnesium. Moreover, magnesium or some other metals react even with such hydroxyl compounds as water as well as with other compounds, so as to evolve gas under neutral or alkaline conditions with generation of heat. In such a case caustic need not be added. Such reagents and reactions are known of themselves so that other suitable examples will now occur to those skilled in the art. Of course, those skilled in the art will recognize that water defines the non-acid condition that is termed neutral. It will now be evident that control by reaction under alkaline, or neutral, conditions, to evolve gas and heat from metallic reagent at moderate temperatures illustrates important aspects of this invention. Moreover, it appears that these reagents and products of reaction, under the conditions created, supplement the actions of various plasticizers used with vinyl resins and enhance the peculiar wall structure and qualities of this vinyl sponge. These co-operating factors yield control of the sponge produced and of processes to manufacture acceptable products of this sponge.

To describe more completely the preferred manner of making and using this invention, further explanation will include specific embodiments thereof. Thus those skilled in the art may understand the principles of the invention and may perceive deviations from these specific illustrations within the meaning of the appended claims.

Vinyl resin, copolymer of vinyl chloride and vinyl acetate resin, for example, was brought to soft but strong sponge condition by reacting caustic soda with particles of aluminum in the resin. This formed gas and brought the resin to such condition that coherent but spongy wall strucure resulted as the gas expanded. The reaction was initiated by localized heat but spread spontaneously throughout the body of resin. This resulted in progressive puffing and setting of spongy resin walls. The product felt soft but was strong and elastic; it bounced back to position on being deformed but resisted tearing. Vinyl resin, copolymer of vinyl chloride and vinyl acetate compositions thus processed were (being copolymers of approximate composition for VYNV-2 of 95% vinyl chloride 5% vinyl acetate and for VYNV-3 of 98% vinyl chloride 2% vinyl acetate):

| | Parts by weight |
|---|---|
| "VYNV-2" resin | 18.0 |
| DOP plasticizer (dioctyl phthalate) | 21.0 |
| Aluminum powder (4%) | 2.0 |
| NaOH (solution, by weight 100 parts NaOH to 150 parts water) | [1] 10.0 |
| | 51.0 |

[1] 40% solution, 8% NaOH.

The over-all density of this vinyl sponge was 7.5 pounds per cubic foot.

A second composition processed likewise was:

| | Parts by weight |
|---|---|
| "VYNV-2" resin | 18.0 |
| DOP plasticizer (dioctyl phthalate) | 18.0 |
| Dibutyl sebacate plasticizer | 3.0 |
| Aluminum powder (4%) | 2.0 |
| NaOH (solution, by weight 100 parts NaOH to 150 parts water) | [1] 10.0 |
| | 51.0 |

[1] 40% solution, 8% NaOH.

The over-all density of this vinyl sponge was 8.7 pounds per cubic foot.

A third composition processed likewise was:

| | Parts by weight |
|---|---|
| "VYNV-2" resin | 9.0 |
| "VYNV-3" resin | 9.0 |
| B-16 plasticizer (butyl phthalyl butyl glycolate) | 12.0 |
| DOP plasticizer (dioctyl phthalate) | 9.0 |
| Aluminum powder (4%) | 2.0 |
| NaOH (solution, by weight 100 parts NaOH to 150 parts water) | [1] 10.0 |
| | 51.0 |

[1] 40% solution, 8% NaOH.

The over-all density of this vinyl sponge was 9.88 pounds per cubic foot.

A fourth composition processed likewise was:

| | Parts by weight |
|---|---|
| "VYNV-3" resin | 18.0 |
| B-16 plasticizer (butyl phthalyl butyl glycolate) | 21.0 |
| Aluminum powder (4%) | 2.0 |
| NaOH (solution, by weight 100 parts NaOH to 150 parts water) | [1] 10.0 |
| | 51.0 |

[1] 40% solution, 8% NaOH.

The over-all density of this vinyl sponge was 11.4 pounds per cubic foot.

These are examples of so-called plastisol compositions, in which the resin is dispersed in vehicle of plasticizer. However, the resin may be dispersed simply as organosol; that is, in vehicle containing besides plasticizer some organic liquid having little or no solvent relation to the resin. In the claims the term "plasticizer vehicle" is used, for lack of a better term, to mean plasticizer or plasticizer and non-solvent organic liquid and thus to apply to both terms plastisol and organosol. As illustration with a known organosol is the composition:

| | Parts by weight |
|---|---|
| "VYNV-2" resin | 18 |
| DOP (dioctyl phthalate) or other plasticizer | 18 |
| Diisobutyl ketone | 18 |
| Powdered aluminum | 2 |
| NaOH (solution, by weight 100 parts NaOH to 150 parts of water) | 10 |

In these illustrations, the first four show about 35% vinyl resin, 40% plasticizer; the fifth shows about 27% vinyl resin, 55% plasticizer and non-solvent organic liquid, all for the purpose of illustration.

Those skilled in the art will now recognize that in these examples other liquids than diisobutyl ketone will serve as non-solvent dispersion medium; also that the vinyl halide co-polymers may vary from less than 75 percent to more 95 percent halide.

It will be observed in the foregoing examples that there is ample sodium hydroxide to react with the aluminum. The solution of 100 parts NaOH to 150 parts water is substantially a saturated solution. In the 10 parts, or 20 percent, of caustic shown, there are about 8 parts NaOH to 4 parts aluminum.

The composition of vinyl resin and plasticizer is converted to sponge form as a result of chemical reaction between the aluminum and the caustic soda. This reaction releases hydrogen gas throughout the plastic mass, so that the plastic gradually puffs out to sponge form. At the same time the resin forms tough but pliable cell walls throughout the mass. This is a result of the reaction as heat is being evolved under the conditions of the chemical reaction, evidently setting and stabilizing the molecular structure of the vinyl resin. Of course the chemical reaction also releases products of metal reaction, such as comprising sodium and aluminum, and such products are distributed in the vinyl resin as the sponge or cell walls are forming. This all occurs as the exothermic mixture extends its reaction progressively throughout the thermoplastic vinyl resin mass. The sponge is of low over-all density, with high strength and elasticity yet with a desirable soft feel.

The process of converting a mass of plasticized vinyl resin to such desirable sponge form utilizes the heat of exothermic chemical reaction within the mass. This may be accomplished in various ways, since, for one reason the preferred chemical reactions are markedly sensitive to the temperature level at which they are effected. Further, the resin mass preferably is in non-acid condition and thus the rate of setting within the molecular structure of vinyl resin is not unduly high. The generation of gas and other products of the reaction under this invention proceeds within the resin simultaneously with the generation of heat by reaction at the particular point and time of formation and of curing of sponge wall. The environment, the generation of pressure as gas is formed, and the particular conditions of temperature and of plasticization of the vinyl resin molecules all are among conditions that contribute to the desirable results obtained.

In this process, moreover, the step of bring about the chemical reaction occurs preferably at relatively low temperatures, such as the general order of room temperatures. As an example, in a mass plasticized vinyl resin containing aluminum and caustic soda at about 60° F. or less very little reaction occurs. Thus at such temperatures the mixture may be poured into suitable molds at rates well adapted to feasible commercial operations. Some resin composition may be made more viscous than is desirable for pouring, but yet be plastic so as to form shaped articles, as those skilled in the art will understand. As the temperature of the composition rises, potential reaction rates rise also. These potentials increase gradually but at room temperatures in many cases yield sufficient reaction and evolution of gas combined with sufficient plastic flow of the vinyl composition to form satisfactory vinyl sponge. These factors are related to time so that in many adaptations of this invention more rapid sponge formation or more rapid molding of spongy articles of vinyl resin involve higher temperature of processing.

These various factors related to temperature are factors of control that permit varying the steps of processing and varying the qualities of the product considerably. Illustrative examples will indicate the nature of such variations.

Referring to any of the vinyl resin compositions described herein, the dry resin and metal, for example, aluminum powder, are mixed together and mixed with plasticizer in any desired manner or order. The mix is brought to any temperature below room temperature or below 70° F., preferably to the range of 40° F. to 0° F. or less, to preclude any significant rate of chemical reaction. Then into this mass of vinyl resin is whipped the aqueous solution of sodium hydroxide, which likewise has been chilled to about the same order of temperature as the resin. The resulting potentially reactive composition now is placed into suitable molds or extrusion machines, as the case may be. Adequate time for such treatment is assured by the low temperature of the composition, this time period for a given composition may be varied extensively, as those skilled in the art will now perceive, by suitable maintenance of low temperatures.

The mold or extrusion machine in which the vinyl sponge is to be formed may itself be chilled to the same order of temperature as the composition, or may be at different temperature. This has a bearing on the sufflation of the vinyl resin and affords an additional means of control.

With the vinyl resin composition at suitable low temperature as indicated, further flexibility of control is afforded by this invention. The actual sponge formation may be initiated in different ways. For example, the composition may be permitted to warm simply by standing in a warmer atmosphere. As the temperature of the mix reaches about 50° F., the desired chemical reaction begins, with puffing of the resin and toughening of the resulting sponge walls. The composition may be heated more rapidly or to higher temperatures, with the chemical reaction being initiated and occurring most vigorously at the portions most quickly heated. This may be at the outside of the mass or next to a heated mold wall, and then spread inwardly.

An exceedingly important specific feature of this invention, however, resides in initiating the heating of the resin to reaction temperature at some selected localized area. Under this invention, the puffing and toughening reaction within the vinyl resin then proceeds progressively to other areas, spreading as though a chain reaction. This may be due partly to the exothermic nature of the chemical reaction to release the gas, partly due to the influence of the non-acid environment as the resin particles are forming tough sponge walls, and partly due to heat-transmitting properties of the composition. In any event, an effective way of heating the vinyl resin composition to initiate sponge formation is to heat the composition internally. Thus with the composition cooled to about 40° F. or below, reaction may be started by placing at some small area of the mass a heated instrument or otherwise forming a localized heated area within the mass. For example, when a heated spatula is inserted into such a mass, the chemical reaction starts in the area of contact and then spreads gradually throughout the whole mass, converting the vinyl resin to desired sponge structure. Particular temperatures depend on the specific operating conditions sought. Or, diathermic or high-frequency, electric heating may be applied to the vinyl mass to initiate the chemical reaction within the composition either locally or more extensively, or applied over longer periods of time to facilitate and control the course of reaction. Usually, the exothermic nature of the reaction itself and the heat transfer qualities of the mix are sufficient but, as those skilled in the art will now recognize, inter-relationships of temperatures with amounts and concentrations of reagents may be varied as well as the degree and properties of sponginess of the vinyl resin product. In any event the exothermic reaction in the vinyl resin composition is initiated by absorbing heat into the composition. Thereafter all the heat is from the exothermic reaction within the composition.

After this formation, the sponge may be washed if desired with water or other suitable material to remove reagents and reaction products.

Inasmuch as the rates of heat evolution and transfer within the vinyl resin mix thus are controllable, this invention is adapted to processes of continual formation of molded spongy articles of vinyl resin. The composition may be fed past a given point by continuous extrusion or fed for continual intermittent filling of a mold, with quick localized heating of the mixture to initiate reaction. If in a mold, then placement of a second mold follows while curing and puffing complete themselves in the first. In either case the rate of gas release or sponge formation is substantially the same as the rate at which the composition is supplied. Thus shaped articles of sponge may be formed in continual manner. The amounts of aluminum powder and of caustic soda, for example, are varied to meet desired rates of production, so that the puffing of the composition occurs in a desired fixed zone with respect to the feed. In other words, the sponge formation occurs continually as fast as the composition is supplied. It will be understood that this adaptability of this invention is found not only when aluminum powder and sodium hydroxide are admixed with vinyl resin but also when other reagents and compositions within the scope of this invention are used.

It will be evident from this description that relatively high temperature heating of the vinyl resin composition is not necessary. At least general heating is not necessary, such as the order of 250° to 400° F. sometimes recommended for various other treatments and materials. This is so whether or not high temperatures are attained locally or temporarily as desired sponginess is brought about throughout the mass. It is quite possible that previously high temperatures have resulted in wall collapse, or in high density, in various other attempts to form satisfactory synthetic resin sponge, just as it is quite possible that in this present invention conditions permit some degree of fusion of resin particles. Indeed this invention permits use of resin particles, but practice of this invention does not depend on theoretical explanation.

Purposes of this invention to achieve control and production of soft, spongy, but tough, vinyl resin products may be furthered to some extent by variation of the plasticizer. Both the size of the openings within the sponge and the density of the product thus may be varied. More than the mere proportioning of plasticizer is involved, however, for though excess of plasticizer may make a readily flowable and soft initial composition, it often develops that when such composition is expanded and set by the chemical reaction herein described, the sponge walls collapse and the product is relatively dense and often not spongy at all.

This invention provides regulation of the size of openings in the sponge by variation of the plasticizer. Selection of the proper type of plasticizer regulates the size of pore or cell. Under this invention, dioctyl phthalate plasticizer produces relatively large sponge openings for a given composition, while dibutyl phthalate plasticizer produces relatively small sponge openings. Similarly plasticizer of butyl phthalyl butyl glycolate produces relatively small sponge openings. Moreover, blending of two or more such plasticizers yields sponge openings of intermediate size openings, but it appears that plasticizer containing a butyl radical predominates. As an example, in the compositions already given, two parts of dibutyl phthalate with one part of dioctyl phthalate produces relatively small openings in the sponge, though somewhat larger than does dioctyl phthalate alone. Even one part of dibutylphthalate produces relatively small openings in the sponge. The sponge in all of these cases is desirably light and soft but tough, or of high tensile strength.

It may be added that in compounding resins of about 75 to 95 percent vinyl halide content and plasticizers with metal powder suitable proportions lie preferably, but not sharply, within the range of eighteen parts resin to eighteen to twenty-three parts plasticizer. Suitable mixing or dispersion may be by various available apparatus, such as paddle or vane mixers or by roll mills.

By this invention a secondary puffing action becomes feasible following the establishment or curing of the resin sponge as above-described. In those cases, use is made of organic agents that evolve gas by spontaneous decomposition at moderate temperatures of about 150° to 250° or 300° F., as a secondary or subsequent action to the initial fixing of the vinyl sponge structure. This secondary action on the cell walls thus already formed increases the volume of the material to an extent that may be as much as about fifty percent, but is controllable to desired lesser degrees of enlargement. This secondary action is dependent on heat treatment following the initial exothermic reaction already described, for release of gas from material previously incorporated in the basic composition prior to the initial reaction. For example, urea may be incorporated in the vinyl resin-plasticizer composition along with the metal powder and reagent therefor. This is carried through the described exothermic reaction and formation of sponge. Then the sponge is heated to decompose the urea, and evolve gas therefrom, with the result of expanding the sponge to greater permanent size. For example, the initial composition may contain about one percent of urea based on the weight of both vinyl resin and plasticizer, in the examples already given. After sponge formation by the exothermic reaction the sponge is heated to about 212° F. for approximately thirty minutes (heating in boiling water is suitable) to expand the sponge. Heating to higher temperature (as for instance in steam or other hot gas) for a longer or shorter period of time yields desired degrees of puffing. Also the proportion of urea may be increased to about five percent. Further, other materials than urea may be used as puffing agents, many being known of themselves as such, organic compounds that decompose on heating moderately as stated to yield gas, though urea is at present preferred. If desired the sponge may be cleaned by washing between the initial sponge formation and the secondary puffing, though washing is not essential.

The examples already cited are not limiting of this invention but are illustrative. As further illustration, the same examples may be taken, but substituting magnesium powder for aluminum and omitting alkali-metal hydroxide. Then the spontaneous exothermic reaction becomes that of magnesium with water, with evolution of heat and of hydrogen gas. The reaction between aluminum and alkali-metal hydroxide is facile to control so that sponge formation may be synchronized with rates of production (as for example in forming the sponge as the composition is being extruded) or correlated to specified densities of sponge or to specified tensile strengths of sponge wall.

Alternative progressive exothermic reactions within the vinyl resin include the addition of metallic oxides or of organic peroxides to the mixes already described, but in general the heat evolution thus gained is not a matter of necessity under this invention. It appears desirable, but sufficient, to obtain evolution of heat at the site of a given particle of the dispersed vinyl resin under the conditions of this invention so as to begin the welding and molecular reorientation of the particle at the same time as gas is evolved at that point. Thus heat is effective at that point and is transmitted effectively from point to point progressively throughout the mass of vinyl resin. This is quite different from heating an entire mass to some uniform temperature or to some relatively high temperature. Under this invention, formation of elastic, soft, tough vinyl sponge or realignment of vinyl molecular forces to develop suitable walls with suitable cellular spaces, of duplicable quality or structure, is a controllable operation at substantially room temperature.

For many uses, the sponge structure desired is one of interconnecting cells, as such structure possesses excellent compression strength and elastic recovery. These properties have been lacking heretofore in porous vinyl products, but are obtained under this invention. For some purposes, it is true, a closed cell structure is sufficient, as sometimes for buoyancy; and such structure may be obtained under this invention by diminishing the proportion of reagents. But what is more important, this invention can produce an open cell structure that is at once light, soft and strong. The usual synthetic resin porous products have been hard and dense or else exceedingly flabby. The present invention yields synthetic vinyl resin sponges suitable for padding furniture, automobile upholstery, under-rug padding, crash padding for automobiles, airplanes and the like, thermal, acoustic and electrically resistant walls, hand sponges for the bath or for cleaning cars or walls, and similar uses where softness and resiliency are needed. The present invention adds also to such products the desirable factor of absence of odor and of taste. In addition this invention provides a sponge that is thermoplastic and so is sealable by heat. This quality is desirable where insulating or sealing properties are useful. These sponges also resist ageing, because these vinyl resins are saturated compounds in many instances. A particular advantage of this invention for commercial production arises from its feasibility with simple apparatus, such as a paste or pony mixer or multiple roller mills to disperse the vinyl resin polymers or co-polymers as suspensions with plasticizers, and molds or even extrusion machines to form the sponge itself, all as contrasted with any requirement for special machines, or any means to recover solvents, or to utilize pressure. The resulting sponge itself may be cut into desired shape or may be shaped while forming, sometimes termed foamed-in-place thus demonstrating the considerable practical flexibility of this invention. Another important quality of this sponge is that it may be entirely sanitary and non-poisonous for use in contact with foods for human consumption since the gas-forming agents may be entirely non-poisonous and moreover may be washed out from the sponge.

Those skilled in this art now will recognize that this invention applies extensively to vinyl resins. These may be inherently plastic or inherently rigid, the latter then being plasticized. Vinyl resins include polyvinyl chloride or butyrate, or acetate or other esters, or similar polyvinylidene esters, as well as co-polymers of vinyl chloride, vinyl acetate and the like, or co-polymers of vinyl chloride and vinylidene chloride and the like. These and other vinyl resins of themselves are sufficiently known to those skilled in the art, and are designated herein simply as vinyl resins. Other thermoplastic resins of themselves are sufficiently well-known that those skilled in the art will recognize such other resins suitable for practice of this invention.

It should be added that under this invention sponges may be formed of desired colors by incorporating appropriate pigments or dyes into the vinyl composition. These agents may be milled into the initial mix without impairing the subsequent formation of spongy walls, as well as applied afterwards to the formed sponge.

In some instances the presence of the metal for releasing gas also facilitates control of the molecular rearrangement that occurs as the spontaneous reaction spreads from particle to particle of the vinyl resin composition being formed into sponge.

There are additional ramifications of this invention, useful in many ways. Thus, it is desirable at times to form articles in which the soft sponge and a hard surface are made unitary as, for example, a hard vinyl resin backing on a soft, elastic vinyl sponge. Also by this invention the soft, tough vinyl resin sponge may be merged into various other hard surfaces. For example the vinyl resin and plasticizer, mixed with metal reagent for the temperature-sensitive exothermic reaction, may be applied to hard surface of various elastomeric materials. Then the exothermic reaction is initiated, with the result that as the sponge forms it also welds or otherwise integrates with the hard elastomeric backing.

Another application of this invention is to form the soft vinyl sponge while forming a hard surface of the same material. This may be brought about by causing the described reaction to occur against a cellulosic surface, such as of paper or of wood. For example the vinyl sponge is formed in a mold having an inner surface of paper or of wood. This is entirely feasible since this invention is carried out at relatively low temperatures below about 250° F., usually about 70° to 100° F. The vinyl sponge thus formed exhibits on its surface next to the paper or wood mold a hard face or skin, approximately of the order of 0.001 inch thickness.

These various modifications of the soft sponge surface occur at areas in contact with various absorbents, whether cellulosic or elastomeric materials. These areas may take the form of either functional or decorative areas. These examples illustrate the formation of the vinyl sponge having designated surface areas relatively hard by reason of their formation in contact with a surface capable of absorbing plasticizer from the vinyl mixture during the exothermic reaction. Thus, also, gradation of softness or of hardness becomes possible between one area and another, as absorbing capacity varies. It will now become evident to those skilled in the art that particular kinds, degrees and qualities of relatively hard backing on the soft sponge may be regulated by the nature of the backing area against which the sponge is formed. For purposes of this application, this backing surface against which the sponge is formed or to which it is welded may be termed a mold surface, since sometimes the sponge may be shaped while forming against such surface.

In accordance with the patent statutes, this invention has been described, with the manner of making and using it, and its principles and best mode of application have been explained, in full, clear, concise and exact terms so that those skilled in the art may make and use it. However, this invention may be practiced in other specific embodiments within the terms of the attached claims.

What is claimed is:

1. A process of producing light, soft, plastic sponge of synthetic resin, comprising intermixing thermoplastic vinyl resin with aluminum and sodium hydroxide for exothermic reaction to release gas, heating the mixture below 150° F. to initiate therein the exothermic gas release, thereby forming soft, elastic sponge, there being present in the mixture about one to five percent urea, and after formation of the soft sponge heating the sponge to about 212° F. to decompose the urea and further expand the sponge.

2. A process of producing light, soft, elastic sponge of thermoplastic synthetic resin, comprising generating heat within a mixture of the resin and continuing heating from within until the mixture becomes spongy, said mixture comprising about 27–35 percent thermoplastic vinyl resin, plasticizer vehicle, sodium hydroxide solution and aluminum metal, the resin being in proportion of 18 parts to 18–23 parts plasticizer, the amount of hydroxide being about double the metal and both being the order of ten percent of the mixture, the hydroxide and the metal being potentially reactive exothermally within the mixture, first absorbing heat into the mixture to initiate said reaction and thereafter supplying all of the heating by said exothermic reaction until the mixture becomes spongy.

3. A process of producing light, soft, elastic sponge of thermoplastic synthetic resin, comprising generating heat within a mixture of the resin and continuing heating from within until the mixture becomes spongy, said mixture comprising about 27–35 percent thermoplastic vinyl resin, the resin being in proportion of 18 parts to 18–23 parts plasticizer, about 15–20 percent aqueous substantially 40 percent sodium hydroxide and about 4 percent aluminum metal, the hydroxide and the metal being potentially reactive exothermally within the mixture, first absorbing heat into the mixture to initiate said reaction and thereafter supplying all of the heating by said exothermic reaction until the mixture becomes spongy.

4. A process of producing light, soft, elastic sponge of thermoplastic synthetic resin in continuous manner, comprising generating heat within a mixture of the resin and continuing heating from within until the mixture becomes spongy, extruding said mixture past a given point, said mixture comprising about 27–35 percent thermoplastic vinyl resin, plasticizer vehicle, the resin being in proportion of 18 parts to 18–23 parts plasticizer, about 15–20 percent aqueous substantially 40 percent sodium hydroxide and about 4 percent aluminum metal, the hydroxide and the metal being potentially reactive exothermally within the mixture, absorbing heat to initiate said reaction in the mixture at said given point of extrusion and thereafter supplying all of the heating by said exothermic reaction until the mixture becomes spongy, and regulating the rate of extrusion to bring said formation of the mixture into sponge at substantially said point of extrusion.

5. A process of producing light, soft, elastic sponge of thermoplastic synthetic resin having a relatively harder surface, comprising placing a mixture of the resin against a cellulosic surface and generating heat within the mixture and continuing heating from within until the mixture becomes spongy, said mixture comprising about 27–35 percent thermoplastic vinyl resin, plasticizer vehicle, the resin being in proportion of 18 parts to 18–23 parts plasticizer, sodium hydroxide solution and aluminum metal, the amount of hydroxide being about double the metal and both being about ten percent of the mixture, the hydroxide and the metal being potentially reactive exothermally within the mixture, first absorbing heat into the mixture to initiate said reaction and thereafter supplying all of the heating by said exothermic reaction until the mixture becomes spongy, the mixture surface in contact with the cellulosic surface becoming relatively harder than the body of the sponge.

6. A process of producing light, soft, elastic sponge of thermoplastic synthetic resin, comprising generating heat within a mixture of the resin and continuing heating from within until the mixture becomes spongy, said mixture comprising about 27–35 percent thermoplastic vinyl resin, plasticizer vehicle, the resin being in proportion of 18 parts to 18–23 parts plasticizer, sodium hydroxide solution and aluminum metal, the amount of hydroxide being about double the metal and both being about ten percent of the mixture, the hydroxide and the metal being potentially reactive exothermally, there being present also in the mixture compound that decomposes spontaneously to evolve gas at moderate temperatures of about 150°–250° F., first absorbing heat into the mixture to initiate said exothermic reaction and thereafter supplying all of the heating by said exothermic reaction until the mixture becomes spongy, said sponge at this formative stage being at temperatures below about 150° F., and thereafter heating the sponge to about 150° F.–250° F. to decompose said additional compound and further expand the sponge.

7. A composition for producing light, soft, elastic sponge of thermoplastic synthetic resin, comprising a mixture of about 27–35 percent thermoplastic vinyl resin, plasticizer vehicle, the resin being in proportion of 18 parts to 18–23 parts plasticizer, sodium hydroxide solution and aluminum metal, the amount of the hydroxide being about double the metal and both being the order of ten percent of the mixture, the hydroxide and the metal being potentially reactive exothermally within the mixture, said mixture being substantially stable at temperatures at least as high as 0° F.

8. A composition for producing light, soft, elastic sponge of thermoplastic synthetic resin, comprising a mixture of about 27–35 percent thermoplastic vinyl resin, about 40–55 percent plasticizer vehicle, the resin being in proportion of 18 parts to 18–23 parts plasticizer, about 15–20 percent aqueous substantially 40 percent sodium hydroxide and about 4 percent aluminum metal, the hydroxide and the metal being potentially reactive exothermally within the mixture, said mixture being substantially stable at temperatures at least as high as 0° F.

References Cited in the file of this patent

UNITED STATES PATENTS

| | | |
|---|---|---|
| 2,019,489 | Flemming | Nov. 5, 1935 |
| 2,291,213 | Cuthberston | July 28, 1942 |
| 2,398,703 | Gardner | Apr. 16, 1946 |

FOREIGN PATENTS

| | | |
|---|---|---|
| 500,298 | Great Britain | Feb. 7, 1939 |
| 571,284 | Great Britain | Aug. 17, 1945 |
| 602,665 | Great Britain | June 1, 1948 |